United States Patent
Kamimura

(10) Patent No.: US 6,956,662 B1
(45) Date of Patent: Oct. 18, 2005

(54) IMAGE WORKFLOW SYSTEM

(75) Inventor: Takeshi Kamimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/244,419

(22) Filed: Feb. 4, 1999

(30) Foreign Application Priority Data

Feb. 5, 1998 (JP) .................................. 10/024132

(51) Int. Cl.[7] .......................... H04N 1/00; G06F 17/00
(52) U.S. Cl. .................... 358/1.15; 358/444; 715/509; 715/530
(58) Field of Search .............................. 358/1.15, 442, 358/444, 468; 707/500, 509, 500.1, 516; 715/509, 530

(56) References Cited

U.S. PATENT DOCUMENTS

| | | | | |
|---|---|---|---|---|
| 5,247,591 A | * | 9/1993 | Baran ........................ | 382/179 |
| RE34,429 E | * | 11/1993 | Baran et al. ................ | 379/100 |
| 5,410,416 A | * | 4/1995 | Amberg et al. ............. | 358/405 |
| 5,465,167 A | * | 11/1995 | Cooper et al. .............. | 358/468 |
| 5,537,401 A | * | 7/1996 | Tadamura et al. ........... | 370/60 |
| 5,552,901 A | * | 9/1996 | Kikuchi et al. ............. | 358/468 |
| 5,819,040 A | * | 10/1998 | Ogaki et al. ................ | 709/217 |
| 5,911,095 A | * | 6/1999 | Atsumi et al. .............. | 399/80 |
| 5,943,412 A | * | 8/1999 | Courvoisier ................ | 379/220 |
| 5,956,681 A | * | 9/1999 | Yamakita ................... | 704/260 |
| 5,973,791 A | * | 10/1999 | Yamamuro et al. ......... | 358/403 |
| 6,020,885 A | * | 2/2000 | Honda ........................ | 345/332 |
| 6,076,121 A | * | 6/2000 | Levine ........................ | 710/62 |
| 6,317,650 B1 | * | 11/2001 | Powell et al. ............... | 700/236 |
| 6,336,078 B1 | * | 1/2002 | Sakayori et al. ............. | 702/81 |

FOREIGN PATENT DOCUMENTS

| | | |
|---|---|---|
| JP | 59-196647 | 11/1984 |
| JP | 5-128295 | 5/1993 |
| JP | 7-152856 | 6/1995 |
| JP | 8-147274 | 6/1996 |
| JP | 8-147379 | 6/1996 |
| JP | 9-81488 | 3/1997 |
| JP | 9-91402 | 4/1997 |
| JP | 9-146932 | 6/1997 |
| JP | 9-191319 | 7/1997 |
| JP | 9-198385 | 7/1997 |
| JP | 9-251432 | 9/1997 |
| JP | 9-305659 | 11/1997 |
| JP | 9-305668 | 11/1997 |
| WO | WO-96/41463 A1 * 12/1996 | ............ H04N 1/00 |

* cited by examiner

Primary Examiner—Joseph R. Pokrzywa
(74) Attorney, Agent, or Firm—Sughrue Mion, PLLC

(57) ABSTRACT

In an image workflow system for use in transferring an operation document to a network including a destination terminal, and image identifying server 12 identifies a species, an operation of the operation document image, and a destination by the use of an identification table and a workflow control table. The species, the operation, and the destination are transferred to the destination terminal in the form of a packet together with the operation document image through the network. Responsive to the operation document image, the destination terminal activates a program and edits the operation document image in accordance with the operation.

13 Claims, 4 Drawing Sheets

SAVINGS DEPOSIT

NAME

ADDRESS     $ ☐☐☐☐☐☐☐

☐☐☐☐☐—☐☐☐☐☐
ACCOUNT NUMBER                NEC BANK

BANK OF NEC    SAVINGS DEPOSIT

☐☐☐☐☐—☐☐☐☐☐            DOLLARS   CENTS
ACCOUNT NUMBER      $ ☐☐☐☐☐☐☐

FIG. 3

14b WORKFLOW CONTROL TABLE

| IDENTIFICATION CODE | FIRST DESTINATION TERMINAL NUMBER | FIRST OPERATION CODE | SECOND DESTINATION TERMINAL NUMBER | SECOND OPERATION CODE |
|---|---|---|---|---|
| 1 | 1 | A | | |
| 1 | 2 | B | | |
| .. | .. | .. | | |
| 25 | 8 | P | 1 | A |
| .. | .. | .. | | |
| 30 | 3 OR 4 | Q | | |
| .. | .. | .. | | |

FIG. 5

IMAGE WORKFLOW SYSTEM

BACKGROUND OF THE INVENTION

1. Field of the Invention

This invention relates to a network system which transmits an operation document image from one terminal to another terminal and, in particular, to an image workflow system which allows an operator of each terminal to do operations to be handled to the operation document image.

2. Description of the Related Art

Heretofore, an image workflow system has been used to successively transfer a document in the form of a document image from one terminal to another terminal through a network. In this connection, the document may be called an operation document while the document image, an operation document image.

For example, the operation document may be a deposit function sheet used in a financial institution, such as a bank. In the financial institution, the operation document image is transferred from one section to another section in the bank and is subjected at each section to manual processing. The processed operation document image is further transferred to another section associated with this document. Finally, the processed operation document image is preserved as an evidence of a conclusion.

Herein, a wide variety of operation documents have been transferred or circulated through the workflow system in the financial institution. In this event, each operator in the sections must judge a species of the documents to execute processing necessary to the document judged and to transfer the processed document to associated sections.

Under the circumstances, a heavy load is imposed on each operator in the conventional workflow system and becomes serious with an increase of the species of the operation document.

Alternatively, an image workflow system for reduction of the operator's load is exemplified in Japanese Laid-Open Patent Publication H 9-81488 (namely, 81488/1997). In this image workflow system, a circulation route formed through a plurality of sections or terminals is at first attached to a document as a route identifier and is scanned by an image scanner or a facsimile into an operation document image. Each terminal extracts the identifier from the operation document image to recognize the circulation route. With this system, the operation document image can automatically be circulated or transferred from one terminal to another through the circulation route.

Thus, the conventional image workflow system may circulate the operation document image. However, the operation document image can never be edited by an operator so as to add a value, a sign to the operation document image.

Also, the conventional system may not handle a document which is used in a financial institution because such a document may not always include a circulation route.

SUMMARY OF THE INVENTION

Therefore, it is an object of the invention to provide an image workflow system in which each terminal may edit an operation document image transmitted from another terminal.

It is another object of the invention to provide an image workflow system of the type described which may easily transmit an operation document image in which a circulation route is not always included.

It is still another object of the invention to provide an image workflow system which may observe availability of each of terminals and select one of the terminals as a destination of an operation document image based on the observation result, and which thereby an increase an efficiency of an operation associated with the selected terminal.

According to an embodiment of the invention, an image workflow system for use in transferring, through a network, an operation document image extracted from an operation document which is featured by a species, a destination, and operation to be handled to the operation document, comprises a workflow control table which stores the species, the destination, and the operation assigned to each operation document, and an image identifying server for identifying the species of the operation document from the operation document image to retrieve the species stored in the workflow control table in response to the identified species, to automatically recognize the corresponding destination and operation, and to transmit a recognized result to the network.

BRIEF DESCRIPTION OF THE DRAWINGS

FIG. 2 shows an example of a document with an identification number used in the embodiment of the invention;

FIG. 3 shows an example of a document without an identification number used in the embodiment of the invention;

FIG. 5 shows an another example of a workflow control according to the invention.

DESCRIPTION OF THE PREFERRED EMBODIMENT

Figure 1:
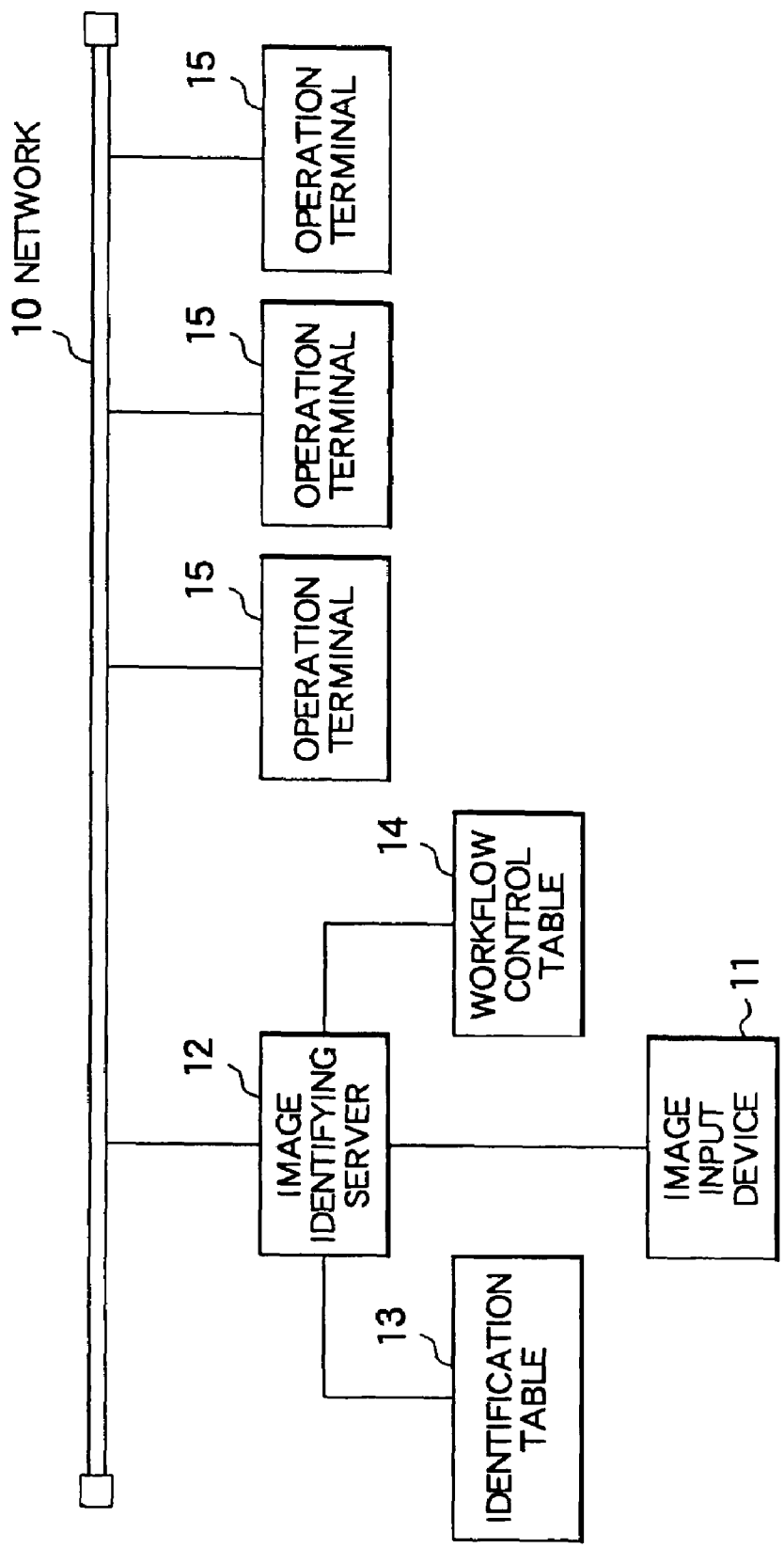
FIG. 1 shows a block diagram of an image workflow system according to an embodiment of the invention.

Referring to FIG. 1, a workflow system according to an embodiment of the invention includes a network 10, an image input device 11, an identification table 13, a workflow control table 14, an image identifying server 12, and a plurality of operation terminals 15.

The image input device 11 may be, for example, an image pickup device, such as an image scanner, a digital camera, and scans an operation document into an operation document image.

The identification table 13 stores in advance, information (will become clear later) required for image identification. The workflow control table 14 stores destinations and identifiers of operations (for example, operation codes) each of which corresponds to an identification code representing a species of each operation document image. The image identifying server 12 identifies the species of each operation document image extracted by the image input device 11 and obtains an identification code. The workflow control table 14 is retrieved by the use of the identification code as a key under control of the image identifying server 12. The image identifying server 12 generates a packet which includes the operation document image as a data part and information, such as a destination and operation code, obtained by the retrieval of the workflow control 14 as a header part, and transmits the packet to a terminal of the destination.

Here, description is made about an example of a document used in a financial institution.

The operation document image obtained by the image input device 11 may be any of a binary image (white and black), a multi-valued image (gray scale), and a color image etc.

Referring to FIG. 2, a format of a savings deposit is shown as an example of the operation document. The document includes an identification code representing the species of the document in its upper right. In this case, the number "25" is printed on the operation document as the identification code.

The image workflow system of the invention may identify the number by OCR (optical character reader). That is, the system optically reads the document by the image input device 11 and recognizes the operation document image supplied by the image input device 11 using character recognition technique.

The identification table 13 stores identification codes each of which corresponds to the species of each operation document.

The character recognition is performed at the image identifying server 12 by using a standardized character pattern (recognition dictionary) and a character code representing an identification code in the identification table 13. Such the method is disclosed in Japanese Laid-Open Patent Publication H 5-128295 (namely, 128295/1993).

Referring to FIG. 3, another format of a saving deposit is illustrated which has no identification code and which is different from that shown in FIG. 2. In this case, the system identifies a kind of document by detecting a location of a title or lines in the operation document. The location of title or lines may be stored in the identification table 13 for the identification. Such the method is disclosed in Japanese Laid-Open Patent Publication H 7-152856 (namely, 152856/1995).

Figure 4:
FIG. 4 shows an example of a workflow control according to the invention.

Referring to FIG. 4, the workflow control table 14a includes entries of an identification code, a destination terminal number, and an operation code. Each of the destination terminal numbers corresponds to one of the identification codes. The destination terminal is representation of a reception terminal which is specified by the identification code included in the operation document image transmitted. The operation code represents the species of the operation performed at the corresponding terminal.

The image identifying server 12 judges whether the operation document image obtained by the image input device 11 is matched with information which has been stored in the identification table 13 and produces an identification code on detecting the matching. Also, since the server 12 is provided with a monitor for displaying the operation document image obtained by the image input device 11 and the resultant identification code, an operator of the system can easily confirm the resultant identification code. If the resultant identification code is obtained incorrectly or is not obtained, the operator may input the correct identification code to the system.

Next, the image identifying server 12 retrieves the workflow control table 14a using the identification code as a key and obtains the destination terminal number and the operation code which correspond to the identification code. Then, the server 12 generates a packet which includes the operation document image of the document obtained by the image input device 11 as a data part. Also, the destination terminal number and the operation code obtained from the workflow control table 14a as a header part. Finally, the server 12 transmits the packet to the destination via the network 10.

The operation terminal 15 destined by the packet extracts the operation code from the header part in the packet, when the terminal receives the packet. Next, the terminal 15 activates a function program on the basis of the operation code, and processes the operation document image in accordance with the function program. The process is, for example, to enter a value, sign, or edit on the operation document image.

Hereinafter, operations of the embodiment of the invention will be described in more detail into the system.

Here, it is assumed that a document shown in FIG. 2 is read by the image input device 11.

The image identifying server 12 reads an identification number in upper right in the document shown in FIG. 2 using OCR, and obtains an identification code 25. Next, the server 12 retrieves the workflow control 14a using the identification code 25 as a key, and obtains a destination terminal number 8 and an operation code P. The server 12 displays these values on its monitor. When an operator confirms them, the server 12 generates a packet which includes the above values (the identification code 25, the destination terminal number 8, and the operation code P) and the operation document image, and transmits the packet to the terminal of the destination terminal number 8 via the network 10.

The destination terminal number may be a network address such as an IP (Internet Protocol)-address.

The operation terminal 15 which corresponds to the destination terminal number 8 obtains the operation code from the header part in the packet, when the terminal receives the packet. Next, the terminal 15 activates a function program which corresponds to the operation code P, and processes on the operation document image of the data part in the packet according to instructions of an operator of the terminal 15.

When operation codes are different for each kind of document, in a conventional system, its operator has to determine a kind of document and transmit the operation document image of the document to a section which is responsible for the document. However, according to the invention, since the image identifying server 12 may identify a kind of document, its operator only confirm the result of the identification, and consequently, efficiency of an operation is improved.

The packet transmitted between the image identifying server 12 and the operation terminal 15 is composed of a data part (the operation document image) and a header part. However, the header and a compressed operation document image may be carried by the packet and the compressed operation document image may be decompressed by a receiving terminal. Thereby, a reduction of data amount in the packet and fast transmission of an operation document image are achieved. Further, when the compressed image is temporarily stored in a system memory, it is possible to reduce a memory area of the system memory occupied by the compressed image included in the packet.

Hereinafter, operations of the invention may be carried out by the use of arrangement different from the workflow control 14a, as will mentioned below.

As shown in the workflow control table 14a of FIG. 4, a destination terminal number and an operation code are determined for each identification code. However, a plurality of destination terminal numbers and a plurality of operation codes may be defined for each identification code, as shown in FIG. 5. The workflow control table 14b illustrated in FIG. 5 has entries of an identification code, a first destination terminal number, a first operation code, a second destination terminal number, and a second operation code.

As shown in FIG. 5, an identification code 1 is associated with a destination terminal number 1 (the first destination terminal number) and operation A (the first operation code). Also, the identification code 1 is associated with a destination terminal number 2 (the first destination terminal number) and operation B (the first operation code).

According to the above first definitions, an operation document image having an identification code 1 are transmitted to terminals of destination terminal number 1 and 2 as a packet with a header part, and different operations A and B are performed on the operation document image at terminals of destination terminal number 1 and 2, respectively.

Also, as shown in FIG. 5, an identification code 25 is associated with a destination terminal number 8 (the first destination terminal number) and operation P (the first operation code). Also, the identification code 25 is also associated with a destination terminal number 1 (the second destination terminal number) and operation A (the second operation code).

According to the above second definitions, an operation document image having an identification code 25 are firstly transmitted to terminal of the destination terminal number 8 as a packet with a header part, and operation P is performed on the operation document image at the terminal. Next, the destination terminal number and the operation code in the header part in the packet are replaced with a next destination terminal number 1 (the second destination terminal number) and a next operation code A (the second operation code) obtained from the header part in the packet received at the terminal of destination terminal number 8. Then, an operation document image processed by the operation P and/or compressed are generated as a data part, and the data part and the header part are combined to produce a new packet. Finally, the new packet is transmitted to the terminal of the destination terminal number 1 and an operation document image of the data part in the packet are performed by the operation A. Using such a definition, operations may be performed sequentially across the terminals.

Also, as shown in FIG. 5, an identification code 30 is associated with a destination terminal number 3 or 4 (the first destination terminal number) and operation Q (the first operation code).

According to the third definition, an operation document image having an identification code 30 may be transmitted to the terminal of the destination terminal number 3 or 4 as a packet with a header part, and the operation Q is performed at the terminal of the destination terminal number 3 or 4. This means that the packet may be transmitted to either of the terminal of the destination terminal number 3 or 4, because both terminals may perform the operation Q. In this case, the image identifying server 12 may observe the availability of both terminals (terminal numbers 3 and 4) via the network 10 prior to transmitting the packet, and may also select one of the terminals which has lowest availability as a destination. This is because such a selected terminal may be probably put into an unused state, in other words, a processing time of the operation at the selected lowest terminal is expected to be smaller than the processing time at the other terminal. Therefore, the server 12 is operable at a high efficiency.

As described above, according to the invention, the image workflow system allows each terminal to automatically execute processing necessary the operation document image transmitted from another terminal.

Also, according to the invention, the image workflow system may easily transmit an operation document image in which a circulation route is not always included.

Furthermore, according to the invention, the image workflow system may observe efficiency of each terminal and may also select one of the terminals as a destination of a packet based on the observation result, to increase an efficiency of an operation.

What is claimed is:

1. An image workflow system for use in transferring, through a network, an operation document image (or a work sheet image) extracted from an operation document which is featured by a species, a destination, and operation to be handled to the operation document, comprising:
   a workflow control table which stores the species, the destination, and the operation assigned to each operation document; and
   an image identifying server for identifying the species of the operation document from the operation document image to retrieve the species stored in the workflow control table in response to the identified species, to automatically recognize the corresponding destination and operation, and to transmit a recognized result to the network,
   wherein the image identifying server observes efficiency of a plurality of terminals and selects one of the terminals which have the lowest efficiency as the destination terminal when the plurality of terminals are associated with the single identification species in the workflow control table.

2. The system of claim 1, further comprising an input device directly coupled to the image identifying server to supply the operation document as the operation document image into the image identifying server.

3. The system of claim 1, wherein the recognized result is transmitted to the network together with the operation document image in the form of a packet.

4. The system of claim 3, further comprising at least one terminal which includes a destination terminal as the destination and which is coupled to the network.

5. The system of claim 4, wherein the operation document image is processed on the basis of the operation designated by the recognized result, at the destination terminal which receives the operation document image.

6. The system of claim 1, wherein the image identifying server identifies the species of the operation document image by using character recognition of an identification code representative of the species when the identification code is included in the operation document image.

7. The system of claim 1, wherein the image identifying server identifies the species of the operation document image by recognizing an image pattern particular to the operation document image when an identification code which stands for the species is not included in the operation document image.

8. The system of claim 5, wherein the destination terminal automatically activates a program performing the corresponding operation to the recognized result when the terminal receives the operation document image.

9. The system of claim 3, wherein the image identifying server transmits the packet to a plurality of destination terminals simultaneously when the plurality of destination terminals are associated with the identified species in the workflow control table.

10. The system of claim 3, wherein the packet is transmitted from a first terminal to a second terminal after processing of the packet at the first terminal according to the destination terminals specified in the packet when the plurality of destination terminals are associated with the single identified species in the workflow control table.

11. The system of claim 1, wherein the destination is an IP address.

12. An image workflow system for use in transferring, through a network, an operation document image (or a work sheet image) which is featured by a species, a plurality of destinations, and at least one operation for each destination to be handled to the operation document image, comprising:
- a workflow control table which stores in advance the species, the destinations, and the at least one operation for each destination assigned to the operation document image, wherein the destinations are ordered to define a predetermined path for transferring the operation document image;
- an image identifying server for identifying the species of the operation document image to retrieve the species stored in the workflow control table in response to the identified species, to automatically recognize the corresponding ordered destinations and the one or more operations for each of the destinations, and to transmit a recognized result together with the operation document image to the network; and
- a plurality of destination terminals as the destinations are coupled to the network;
- wherein the operation document image is processed on the basis of the one or more operations designated by the recognized result, at each destination terminal which receives the operation document image in the predetermined order; and
- wherein each destination terminal automatically activates at least one program performing the corresponding one or more operations to the recognized result when the destination terminal receives the operation document image.

13. An image workflow system for use in transferring, through a network, an operation document image (or a work sheet image) which is featured by a species, a destination, and operation to be handled to the operation document image, comprising:
- a workflow control table which stores in advance the species, the destination, and the operation assigned to each operation document image;
- an image identifying server for identifying the species of the operation document image to retrieve the species stored in the workflow control table in response to the identified species, to automatically recognize the corresponding destination and operation, and to transmit a recognized result together with the operation document image to the network; and
- at least one terminal which includes a destination terminal as the destination and which is coupled to the network;
- wherein the recognized result is transmitted to the network together with the operation document image in the form of a packet;
- wherein the operation document image is processed on the basis of the operation designated by the recognized result, at the destination terminal which receives the operation document image;
- wherein the destination terminal automatically activates a program performing the corresponding operation to the recognized result when the terminal receives the operation document image; and
- wherein the image identifying server observes efficiency of a plurality of terminals and a terminal having the lowest efficiency is selected as the destination terminal when the plurality of terminals are associated with the single identification species in the workflow control table.

* * * * *